May 1, 1934.  E. NOYACK  1,957,282
SHEET METAL NUT
Filed Dec. 29, 1932
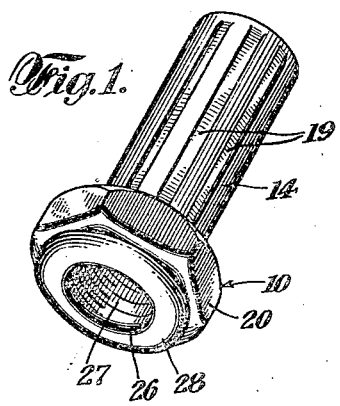
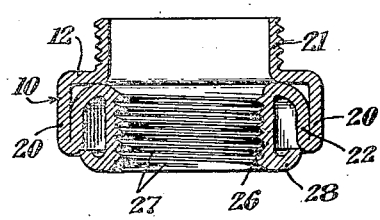
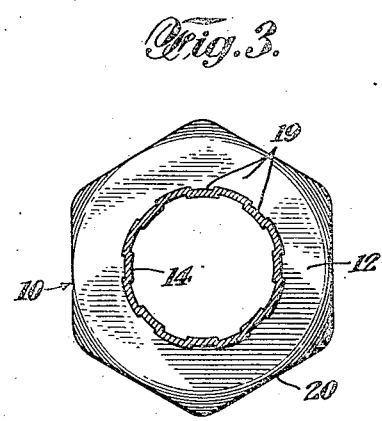
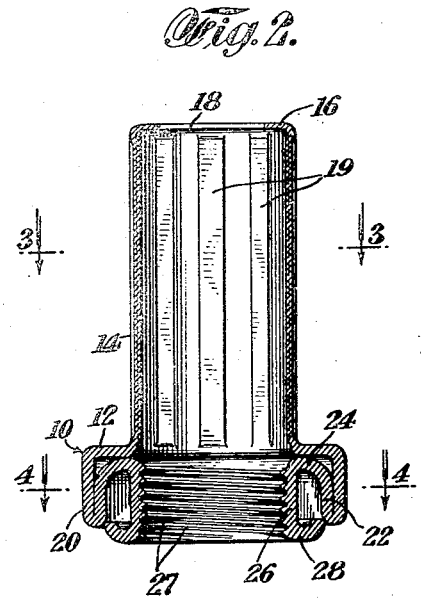
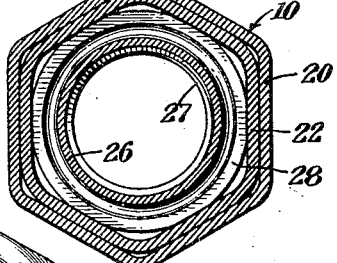
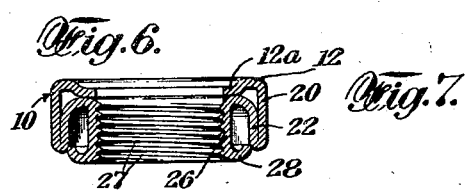
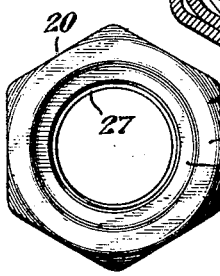
INVENTOR
Edward Noyack
BY
Prindle Bean + Mann
ATTORNEY Patented May 1, 1934

1,957,282

UNITED STATES PATENT OFFICE 1,957,282

SHEET METAL NUT

Edward Noyack, Seymour, Conn., assignor to Bridgeport Brass Company, Bridgeport, Conn., a corporation of Connecticut Application December 29, 1932, Serial No. 649,243

15 Claims. (Cl. 85—32)

This invention relates to sheet-metal nuts. More particularly it relates, in the preferred form shown, to a sheet-metal rim-nut for use with pneumatic valves for engaging the wheel-rim or felly, and drawing the valve-stem inwardly to a firm seat. This rim nut is shown made entirely of sheet metal and is in one piece. Preferably, but not necessarily, the construction provides a tubular upward extension for enclosing and protecting the valve-stem at its sides. Also preferably, but not necessarily, the construction provides a projecting, integral, annular rib on the under side of the nut adapted to engage and frictionally grip the wheel-rim or felly and the like.

The invention provides a particularly strong, self-reinforcing sheet-metal nut, and also includes other features and advantages.

In the accompanying drawing:

Fig. 1 shows in perspective a preferred form of rim nut embodying the invention;

Fig. 2 is a vertical cross sectional view of said nut partly in elevation;

Figs. 3 and 4 are cross sectional views on the lines 3—3 and 4—4 respectively, in Fig. 2 looking downwardly;

Figs. 5 and 6 respectively are views similar to Fig. 2 of modified forms of sheet metal nuts within the invention of that shown in Fig. 2; and Fig. 7 is a top plan view of the nut of Fig. 6.

The same reference numerals have been applied to the same parts in the different forms.

Referring to the form shown in Figs. 1 to 4, 10 designates the rim nut as an entirety which is formed of a single sheet metal blank suitably drawn and shaped. It may be described as comprising an annular top portion 12 having at its inner periphery an integral, tubular, upward extension 14 flanged inwardly at the top 16 to leave a central opening 18 for the upper end of the valve stem (not shown) to project through. This tubular extension is relatively thin walled compared to the rest of the nut, but nevertheless is sufficiently strong and rigid; and is made additionally so by the longitudinal corrugations 19 formed in its tubular wall.

At the outer periphery of the top portion 12 of the nut, there is an integral downward extension 20 which folds inwardly back on itself at 22 to form a double-ply flange constituting the outside of the nut, thence extends inwardly at 24 under the top portion 12, preferably in supporting contact therewith, to the inner periphery of said top portion, where it turns abruptly downward in the form of a short tube 26 which is internally threaded at 27 and forms the inside of the nut.

From the lower end of this tube 26 there is an integral extension 28 downwardly, outwardly and then upwardly towards the free edge of the double-ply flange. In this way an annular gripping rib 28 is formed projecting from the underside of the nut. Preferably the edge of this rib contacts with the edge of the double-ply flange at its inner corner, thereby giving additional resistance to the flange against inward collapse when the wrench is applied to the nut. This coaction also serves to distribute the thrusts when the nut is in use.

The double-ply flange 20—22 may be left cylindrical and knurled, but usually will be pressed into polygonal form with flat wrench engagement faces, here shown as hexagonal, for tightening the nut against the wheel-rim or felly.

These wrench engaging faces formed in the double-ply flange serve to unify the plies 20—22 to a still greater extent, thereby imparting added strength and rigidity to the outside of the nut.

It will be seen that the top, outside and inside portions of the nut are formed of relatively thick metal as is also the annular rib at the bottom of the nut. This coupled with the shape of the parts and the coaction between them produces a particularly rugged sheet-metal nut.

Fig. 5 shows another form of tire valve rim nut within the invention which is the same in all respects as that just described, except that the tubular upward extension is reduced in height to a relatively short external screw-threaded extension 21 adapted to be engaged by the ordinary internal screw-threaded cap (not shown) for enclosing the exposed portion of the valve stem to protect it from dirt and injury.

Figs. 6 and 7 are views of a third form of nut within the invention which omits altogether the upward tubular extensions 14 and 21. The annular top portion 12 of this nut is shown bent downwardly along a median zone to form an annular depressed portion or step 12a at its inner periphery. This conformation stiffens and strengthens the top of the nut and besides improves its appearance and finish; and affords a seat for the lower end of the dust cap.

While I have shown and described three embodiments of my invention, it will be understood that the invention is not limited to the precise construction which they embody, but within the spirit and scope of the invention and the appended claims said construction is capable of various changes and modifications.

What I claim is:

1. A sheet-metal rim-nut having a top; and an extension, integral with the outer periphery of said top, extending downwardly at said outer periphery and then being infolded and turned back on itself to form a double-ply flange for the outside of the nut, thence extending inwardly under said top and then downwardly in the form of a centrally located tube adapted to be internally screw-threaded and to form the inside of the nut.

2. A sheet-metal rim-nut having a top; an extension, integral with the outer periphery of said top, extending downwardly at said outer periphery to form a flange and then being infolded and extending upwardly and inwardly under said top and then downwardly in the form of a centrally located tube adapted to form the inside of the nut; and an integral extension from the lower end of said tube toward the free edge of the double-ply flange in the form of an annular rib projecting below the under side of the nut.

3. A sheet-metal rim-nut having a top; an extension, integral with the outer periphery of said top, extending downwardly at said outer periphery and then being infolded and turned back on itself to form a double-ply flange for the outside of the nut, thence extending inwardly under said top and then downwardly in the form of a centrally located tube adapted to form the inside of the nut; and an integral extension from the lower end of said tube contacting with the double-ply flange at its free edge.

4. A sheet-metal rim-nut having a top; an extension, integral with the outer periphery of said top, extending downwardly at said outer periphery to form a flange and then being infolded and thence extending upwardly and inwardly under said top and then downwardly in the form of a centrally located tube, whose lower end extends somewhat below the level of the free edge of the flange; and an integral extension from the lower end of said tube extending outwardly and upwardly into contact with the flange at its free edge.

5. A sheet-metal rim-nut having a top; and an extension, integral with the outer periphery of said top, extending downwardly at said outer periphery to form a flange and then being infolded and extending upwardly and inwardly in contact with the under side of said top and then downwardly in the form of a centrally located tube, adapted to be internally screw-threaded, for the inside of the nut.

6. A sheet-metal rim-nut having a top; an extension, integral with the outer periphery of said top, extending downwardly at said outer periphery and then being infolded and turned back on itself to form a double-ply flange which is formed to have wrench engagement faces, thence extending inwardly under said top and then downwardly in the form of a centrally located tube adapted to form the inside of the nut.

7. A sheet-metal rim-nut having a top; an extension, integral with the outer periphery of said top, extending downwardly at said outer periphery and then being infolded and turned back on itself to form a double-ply flange which is formed to have wrench engagement faces, thence extending inwardly under said top and then downwardly in the form of a centrally located tube adapted to form the inside of the nut; and an integral extension from the lower end of said tube contacting with the flange at its free edge.

8. A sheet-metal rim-nut having an annular top; an extension, integral with the inner periphery of said top, extending upwardly at said inner periphery in the form of a tube; and an extension, integral with the outer periphery of said top, extending downwardly at said outer periphery to form a flange and then being infolded and extending upwardly and inwardly in contact with the annular top adjacent the inner periphery thereof, and then downwardly in the form of a centrally located tube, adapted to form the inside of the nut, with its wall in alinement with the wall of the aforesaid upward tubular extension.

9. A sheet-metal rim-nut having an annular top; an extension, integral with the inner periphery of said top, extending upwardly at said inner periphery in the form of a tube; and an extension, integral with the outer periphery of said top, extending downwardly at said outer periphery and then being infolded and turned back on itself to form a double-ply flange for the nut, thence extending inwardly under said annular top to the inner periphery thereof, and then downwardly in the form of a centrally located tube, adapted to form the inside of the nut.

10. A sheet-metal rim-nut having an annular top; an extension, integral with the inner periphery of said top, extending upwardly at said inner periphery in the form of a tube, said upward extension having its tubular wall stiffened with longitudinal corrugations formed therein; and an extension, integral with the outer periphery of said top, extending downwardly at said outer periphery to form a flange and then being infolded and extending upwardly and inwardly under said annular top to the inner periphery thereof, and then downwardly in the form of a centrally located tube, adapted to form the inside of the nut.

11. A sheet-metal rim-nut having an annular top; an extension, integral with the inner periphery of said top, extending upwardly at said inner periphery in the form of a tube, said upward tubular extension being inwardly flanged at its open upper end; and an extension, integral with the outer periphery of said top, extending downwardly at said outer periphery to form a flange and then being infolded and extending upwardly and inwardly under said annular top to the inner periphery thereof, and then downwardly in the form of a centrally located tube, adapted to form the inside of the nut.

12. A one-piece sheet-metal nut comprising a circumferentially endless tubular ring, having an outer wall which is arcuate in cross-section subtending a flat, vertical, inner wall, the flat inner wall forming a cylindrical tube adapted to form the center of the nut, the arcuate outer wall being made up of a relatively short arcuate portion integral with the lower end of said tube in abutting relation with a long arcuate portion integral with its upper end; and a top for said nut over said tubular ring, said top having a downwardly extending flange whose lower edge is connected by an integral fold with the free edge of the aforesaid long arcuate portion.

13. A one-piece sheet-metal nut comprising a circumferentially endless tubular ring, having an outer wall which is arcuate in cross-section subtending a flat, vertical, inner wall, the flat inner wall forming a cylindrical tube adapted to form the center of the nut, the arcuate outer wall being made up of a relatively short arcuate portion integral with the lower end of said tube in abutting relation with a long arcuate portion integral with its upper end; and a top for said nut over said tubular ring, said top having a downwardly extending flange whose lower edge is connected by an integral fold with the free edge of the aforesaid long arcuate portion; the lower end of said tube and the connected arcuate portion extending to a somewhat lower level than the edge of the flange.

14. A one-piece sheet-metal nut comprising a circumferentially endless tubular ring, having an outer wall which is arcuate in cross-section subtending a flat, vertical, inner wall, the flat inner wall forming a cylindrical tube adapted to form the center of the nut, the arcuate outer wall being made up of a relatively short arcuate portion integral with the lower end of said tube in abutting relation with a long arcuate portion integral with its upper end; and a top for said nut over said tubular ring, said top having a downwardly extending flange whose lower edge is connected by an integral fold with the free edge of the aforesaid long arcuate portion, said flange and long arcuate portion being formed to have juxtaposed wrench engagement faces.

15. A one-piece sheet-metal nut comprising a circumferentially endless tubular ring, having an outer wall which is arcuate in cross-section subtending a flat, vertical, inner wall, the flat inner wall forming a cylindrical tube adapted to form the center of the nut, the arcuate outer wall being made up of a relatively short arcuate portion integral with the lower end of said tube in abutting relation with a long arcuate portion integral with its upper end; and an annular top for said nut bent downwardly along a median zone to form an annular depressed portion or step at its inner periphery over said tubular ring, said top at its outer periphery having a downwardly extending flange whose lower edge is connected by an integral fold with the free edge of the aforesaid long arcuate portion, said flange and long arcuate portion being formed to have juxtaposed wrench engagement faces.

EDWARD NOYACK.